Patented Feb. 27, 1934

1,948,717

UNITED STATES PATENT OFFICE 1,948,717

PROTECTIVE ARRANGEMENT FOR ALTERNATING CURRENT POLYPHASE POWER TRANSMISSION SYSTEMS

Reginald Otto Kapp and Charles George Carrothers, London, England, assignors of one-half to The General Electric Company Limited, London, England, a corporation of Great Britain Application April 23, 1932, Serial No. 607,206
In Great Britain May 1, 1931

20 Claims. (Cl. 175—294)

This invention relates to discriminative protective arrangement for sectionalized alternating current polyphase electric power transmission systems in which directional relay means at either end of a section is adapted to exert a control through a channel of communication extending to the other end of the section. In a discriminative protective arrangement of this kind discriminative action is dependent on the operation of the directional relay means which may be arranged to permit or control cutting out of a faulty section or/and to prevent cutting out of a sound section under fault conditions. Now when there is a fault on a polyphase system there is some uncertainty as to the direction of flow of power in each of the phases. It is quite possible that power may be fed past the fault on a sound phase while it is being fed towards the fault on a faulty phase. If single phase directional relays are installed, one on each phase, it is possible that at the same station one or more of these will be set in a position indicating the flow of power into the section protected, whilst one or more may at the same time be set in a position indicating the flow of power out of the section protected. It follows that if the protective arrangement utilizes the operation of directional relays at opposite ends of a section to effect selective isolation of the section when faulty, whilst relays of a faulty phase will successfully clear the fault, there is the risk that at the same time the directional relays at opposite ends of a sound section may set themselves on the different phases so as to clear that section. On the other hand if the protective arrangement utilizes the operation of directional relays at an end of a section to prevent cutting out of the section when sound under fault conditions, whilst the relays of sound sections will prevent cutting out of those sections, there is the risk that at the same time a directional relay at an end of the faulty section may set itself to prevent cutting out of that section. Single-phase directional relays therefore cannot usefully be employed and the use of simple single phase directional overload relays is no solution to the problem since under overload conditions with reduced line voltage the operation of such relays is unreliable.

It has therefore been considered necessary in a three phase system to employ three phase directional relays. A three phase directional relay sets itself in the direction given by the resultant of the powers in all the phases. So long as the power in the faulty phase or phases which is fed into the faulty section preponderates over power in the sound phases or phase flowing away from the section the discriminative action of such directional relays may be relied upon. Whilst such conditions for correct operation may hold for many systems it is not certain that it will hold generally. It is quite conceivable that on certain lines and under certain operating conditions the power fed on the sound phases past a fault and into a sound section may exceed the power fed in the opposite direction into the faulty phase and under such circumstances a protective system depending upon the correct setting of a three phase directional relay will fail to clear the fault.

Further, since the line voltage will in general be reduced by a fault, the reduction being progressively greater as the fault is approached, the torque for given current conditions of a directional relay at the end of a sound section nearer a fault will be less than the torque of a directional relay at the end of the section further from the fault and in a protective arrangement in which the setting of a directional relay indicative of power flowing into a section tends to effect cutting out of the section and the setting of a directional relay indicative of power flowing out of the section prevents cutting out of the section, such difference in torque may result in cutting out of a sound section.

An object of the invention therefore is the provision of protective arrangements which may be relied upon to operate selectively to afford protection, whilst in general the invention is directed towards the provision of improved protective arrangements.

In a discriminative protective arrangement according to the present invention separate single phase directional and overload or current elements are used and the directional and overload or current elements of different phases of a section are adapted severally to act jointly or in conjunction to exert control.

In one arrangement, separate single phase directional and overload or current elements are used and directional and overload or current elements associated with the same phase at an end of a section are adapted to act jointly or in conjunction to exert control, whilst in order to ensure discriminative operation it is arranged by means of the load settings or/and through the rates or times of operation that an overload or current element and overload or current relay means adapted to control cutting out of a section end shall operate in definite sequence. Moreover, protection against earth faults is given by a directional earth leakage relay and by two earth leakage relays disposed at either end of a section and in order to ensure discriminative operation it is arranged by means of the setting or/and through the rates or times of operation that the earth leakage relays shall operate in definite sequence. It is also arranged that upon operation one of the earth leakage relays renders the adjacent directional and overload or current elements ineffective.

Means are provided which when the section is sound operate under fault conditions and are adapted when the fault is cleared to restore with a time lag and to inhibit cutting out of the section under the control of overload or associated relay means before time has elapsed for the latter to return to the normal condition.

Operation of the directional and overload elements of a phase or of the directional earth leakage relay when power flows out of the section to a fault is adapted to prevent isolation of the far end of the section and means are provided whereby in the event of failure of a circuit breaker to cut out the end of a faulty section adjacent to a sound section the control exerted from the end of the sound section adjacent the faulty section to prevent cutting out of the sound section at the far or/and at the near end thereof is cancelled or rendered ineffective.

The invention will now be described by way of example with reference to the accompanying diagrammatic drawings showing the invention applied to the protection of a three phase earthed transmission system, comprising, for example, a ring main, with overhead conductors, a single phase conductor only being shown and the contacts of the directional and overload or current elements and overload or current relays only being shown for the sake of simplicity. Figure 2 is a modification of Figure 1 and Figure 3 indicates one way in which the arrangement shown in Figure 2 may be modified.

Figure 1:
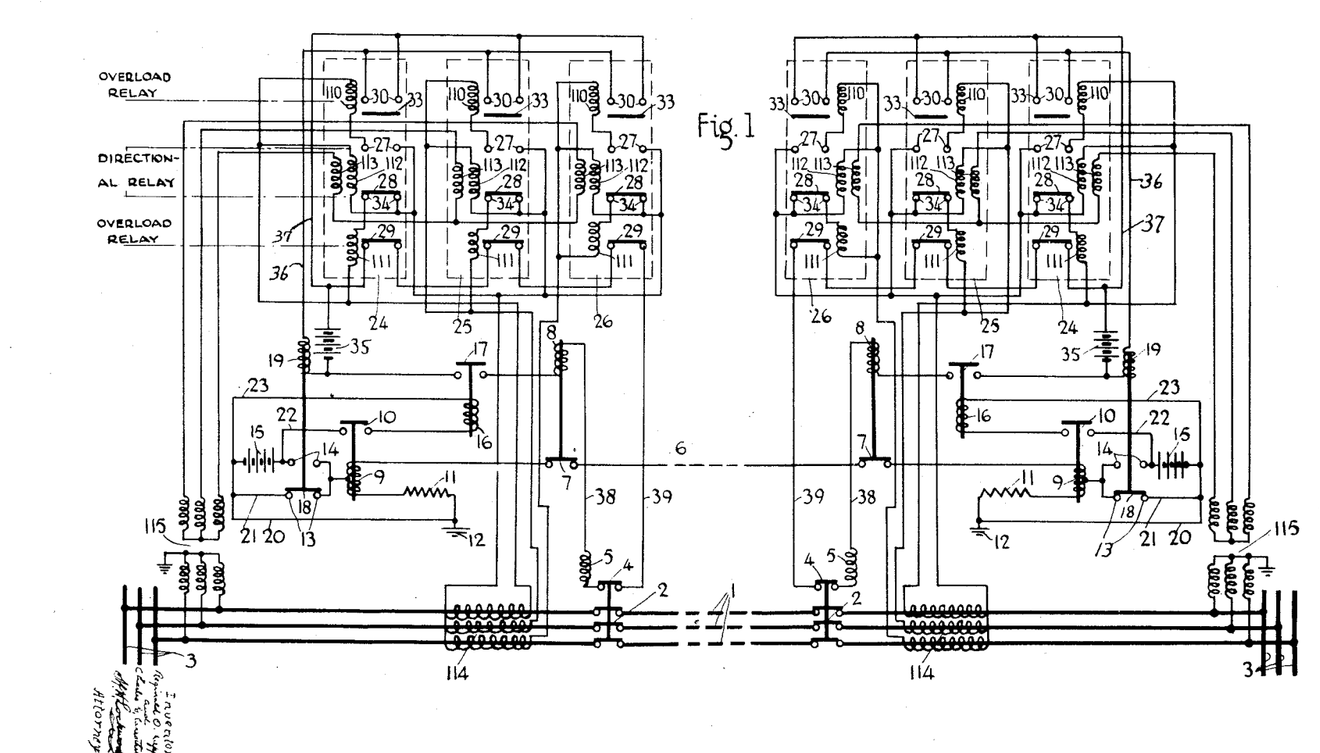
Figure 1 shows a single section of the system with the relays at opposite ends of the section and control apparatus operating through a pilot wire or equivalent conductor.
Figure 2:
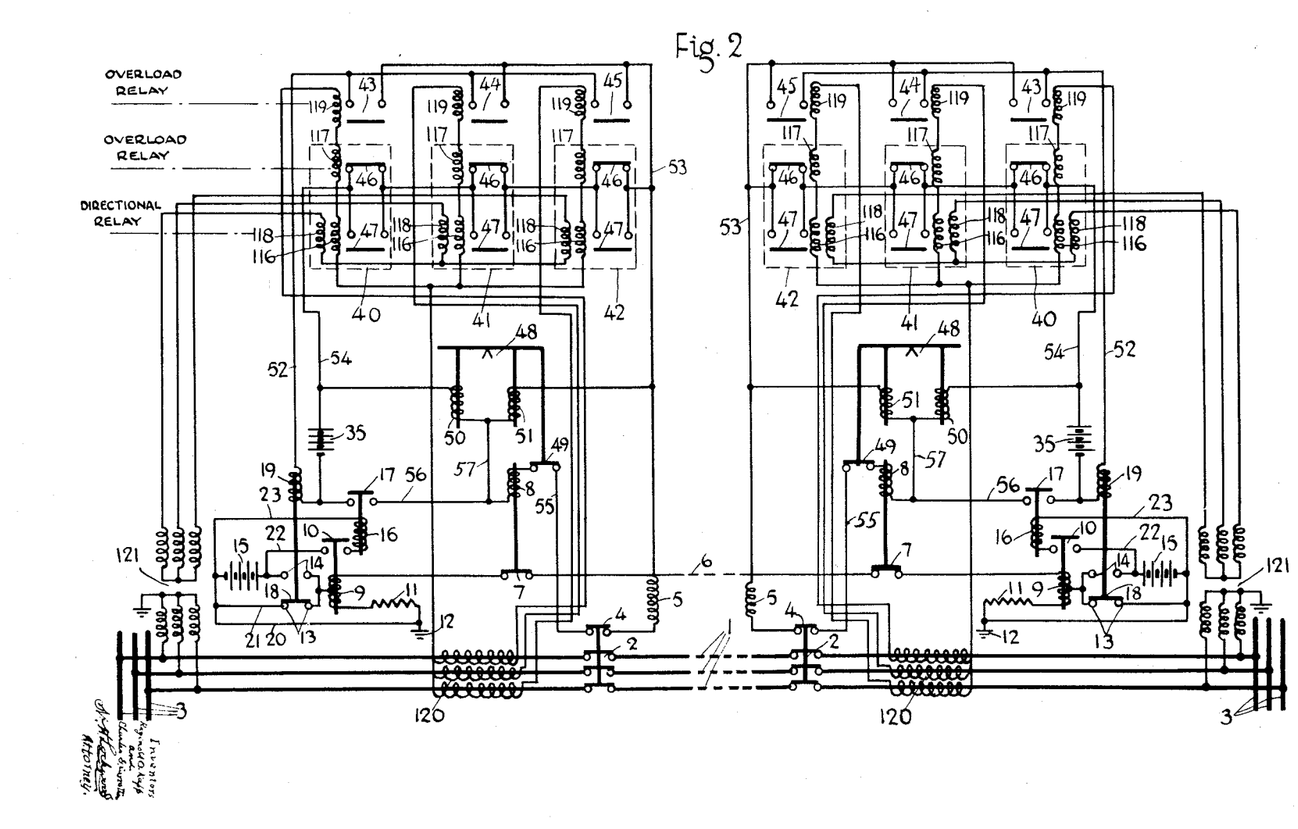

In Figures 1 and 2 the section 1 of the phase conductors is adapted to be connected at either end of the section through the main contacts of an oil circuit breaker 2 to the busbars 3. Each circuit breaker is provided with auxiliary contacts 4 which open together with the main contacts and which are connected in series with the trip coil 5 of the circuit breaker.

From end to end of the section extends a pilot wire 6 which at either end is connected through the normally closed contacts 7 of a pilot relay having an energizing coil 8, with the coil 9 of a differential relay with normally open contacts 10 and a resistance 11 to earth at 12. The two "earths" 12 may of course be the ends of a second insulated pilot wire. When the coil 8 of a pilot relay is deenergized the contacts 7 reclose with a time lag. Each coil 9 has a mid-point tapping connected to one contact of a pair of lower contacts 13 and the pair of upper contacts 14 of an auxiliary or control relay provided with a movable contact 18 which normally bridges the contacts 13, but which upon energization of the coil 19 of the relay opens the contacts 13 and closes the contacts 14. The other of the pair of contacts 14 is connected to the positive pole of a battery 15, the negative pole of which is connected through conductor 20 to earth at 12, whilst the other of the contacts 13 is connected through the conductors 21 and 20 to earth at 12.

Normally there is no circuit through a battery 15, but when the coil 19 of a control relay at an end of the section, say the left hand end of the section, is energized, the contacts 14 being closed and the contacts 13 opened there is a circuit at the left hand station between the terminals of the battery 15 through contacts 14 and 18, the lower half of the coil 9 of the differential relay, resistance 11 and conductor 20. There is also a circuit starting from the left hand station as follows:—earth 12, conductor 20, battery 15, contacts 14 and 18, upper half of the coil 9 of the differential relay, pilot relay contacts 7, pilot wire 6, pilot relay contacts 7, upper half of the coil 9 of the differential relay, contacts 13 and 18 of the control relay, conductor 21, 20 and earth 12 at the right hand station. Now each resistance 11 is equal in value approximately to the resistance of the pilot wire 6 together with the resistance of one half a differential relay coil. It therefore follows that the currents in the half coils of the left hand differential relay are substantially equal and as they act oppositely the relay remains unoperated. The differential relay at the right hand station, however, operates.

If both control relays 19 are operated together the lower half coils of both differential relays are energized. The energizing circuit has already been traced for the left hand relay. Since, however, the batteries 15 which are similar act in opposition over the pilot wire 6 the upper half coils remain unenergized and both differential relays operate.

When a differential relay operates there is a local circuit between the terminals of a battery 15 through conductor 22, differential relay contacts 10, coil 16 of the tripping relay and conductor 23 and the tripping relay closes its contacts 17.

Referring now to Figure 1 of the drawings at either end of the section are three single phase directional overload relay means 24, 25 and 26 each of which besides a sensitive directional element includes an overload element with contacts 30 and an operating coil 110 and an overload element or relay with contacts 29 and an operating coil 111. The relay means 24 at both ends are associated with and responsive to the conditions of one phase, the relay means 25 at both ends are associated with and responsive to the conditions of a second phase and the relay means 26 at both ends are associated with and responsive to the conditions of a third phase.

Each directional element of a relay means includes a current coil 112, a voltage coil 113, a moving contact 28 and contacts 34 which are closed by the contact 28 when power is flowing in the associated phase out of the adjacent end of the section and are opened when power is flowing in the associated phase into the adjacent end of the section. The overload relay contacts 29 are normally closed and the energizing coil 111 of the overload relay is connected in series with the contacts 34 of the directional element, whereby the contact 29 can be opened only when power is flowing in the associated phase out of the adjacent end of the section.

Similarly the overload element 30 of the directional overload relay means is given its directional characteristics by means of contacts 27 included in the directional element, the contacts 27 being in series with the operating coil 110 of the overload element. The contact 28 of the directional overload relay means closes the contacts 27 when power is flowing in the associated phase into the adjacent end of the section and opens the contacts 27 when power is flowing out of the end of the section. Hence an overload element, the contacts of which are normally open, can be closed only when power is flowing in the associated phase into the end of the section adjacent to the relay means.

By giving the overload elements with the contacts 30, a higher current setting than that of the overload relays with the contacts 29 or/and by arranging the overload elements to close more slowly than the overload relays open it is ensured that when a heavy overload current flows through the section an overload relay at one end of the section shall open before an overload element closes at the other end of the section. When the coil of an overload relay is deenergized the element recloses its contacts 29 with a time lag.

The coils 110, 111 and 112 of the relay elements are coupled to the phase conductors through current transformers 114; the voltage coils 113 of the directional elements are coupled to the phase conductors through a potential transformer 115.

The contacts 29 of the directional overload relay means 24, 25 and 26 at an end of the section are connected in series with one another and with a conductor 39, auxiliary contacts 4 and trip coil 5 of the circuit breaker, conductor 38, pilot relay coil 8, and tripping relay contacts 17 across a battery 35.

The contacts 30 of the overload elements at the end of the section are connected in parallel with one another and to one pole of the battery 35 through a conductor 37 and to another pole of the battery through a conductor 36 and control relay coil 19.

In operation the directional element of the directional overload relay means of a phase at an end of the section assumes a position in dependence on the direction in which power is flowing in the phase at the said end. Normally, therefore the directional elements at opposite ends will assume dissimilar positions but the contacts of the overload elements and overload relays will be in the positions shown. If there is a fault, say to the right of the section, for example, in the first phase, at the right hand end of the section the contact 28 of directional overload relay means 24 will bridge the contacts 34 and the contacts 29 of the overload relay of the relay means will open. At the left hand end of the section the contact 28 of the directional overload relay means 24 will bridge the contacts 27 and the overload element will close its contacts 30. As a result the coil 19 of the control relay is energized and that relay operates and effects operation of the differential and tripping relays at the right hand end of the section. Closure of the contacts 17, however, is ineffective to energize the tripping circuit since an overload relay has previously opened its contacts 29. Stability is also maintained at the left hand end of the section since the contacts 17 have not closed. When the fault is cleared any danger which there might be of the right hand end of the section being incorrectly cut out owing to reclosure of the contacts 29 of the overload relay before the tripping relay contacts 17 opened is avoided since the contacts 29 reclose with a time lag. It will be noted that this result is obtained without affecting the stability or quickness of operation of the system.

Let it now be supposed that there is a fault in the section, say in the first phase, fed from both ends. At either end the contact 28 of the directional overload relay means 24 bridges the contacts 27 and the overload element closes its contacts 30. Hence the coil 19 is energized and consequent operation of the differential relay effects closure of the tripping relay contacts 17 and since the contacts of the overload relays are closed the trip coil 5 is energized. Therefore the circuit breakers 2 at the ends of the section are opened.

If there is a fault in the section, let it again be supposed in the first phase, fed from only one end, say the left hand end, then the contact 28 of the directional overload relay means 24 at the left hand end bridges the contacts 27 and the overload element closes its contacts 30. Thus the coil 19 of the control relay at that end is energized with the result that the tripping relay at the right hand end closes its contacts 17. The tripping circuit at the latter end is then energized since the overload relay contacts 29 are closed, with the result that the pilot relay immediately opens its contacts 7 and the circuit breaker 2 is tripped open. When the pilot relay opens its contacts, since no current flows in its upper half coil, the differential relay at the left hand end of the section operates to energize the tripping relay which effects isolation of the left hand end of the section.

If there is an overload on more than one phase the operation is similar to that described above but the directional overload relay means of the different affected phases are influenced. For example, if there is an overload current in the first and second phases with power flowing through the section from right to left the overload element contacts 30 of the directional overload relay means 24 and 25 at the right hand end will close and the overload relay contacts 29 of the directional overload relay means 24 and 25 at the left hand end of the section will open.

In Figure 2 the directional and overload elements and overload relays are somewhat differently arranged and additional relays 48 are provided for the purpose of preventing inadvertent interruption of the circuit through the section when sound upon clearance of a fault in another section.

At either end of the section are three directional overload relay means 40, 41 and 42, respectively associated with and responsive to the conditions of the first, second and third phases at the section end. At either end of the section also are three overload relays 43, 44 and 45 respectively associated with and responsive to the conditions of the first, second and third phases at the section end. Each of the relays 43, 44 and 45 is provided with an operating coil 119.

Each directional overload relay means comprises a sensitive directional element including a current coil 116, a voltage coil 118 and a contact 47 which closes when power flows in the associated phase into the section and opens when power flows in the associated phase out of the section, and an overload element including an operating coil 117 and a contact 46 which is biased to the closed position but which opens when the phase current reaches a predetermined value. The contacts 46 and 47 of each directional overload relay means are arranged in parallel with one another and the contacts of the directional overload relay means 40, 41 and 42 at each section end are series connected.

The contacts of the overload relays 43, 44 and 45 at a section end are arranged in parallel with one another and each relay is normally open but is adapted to close when the current of the associated phase reaches a predetermined overload value.

By giving the overload elements 46 a lower setting or/and by arranging them to operate more quickly than the overload relays 43, 44 and 45 it is ensured that when an overload current flows through the section an overload element of a phase at the end from which the power flows opens before closure of an overload relay at the end into which the power flows.

The coils 116, 117 and 119 are coupled to the phase conductors through current transformers 120; the coils 118 are coupled to the phase conductors through a potential transformer 121.

The tripping circuit extends between the terminals of a battery 35 through conductor 54, the contacts of the directional overload relay means 40, 41 and 42, conductor 53, trip coil 5, auxiliary contacts 4, conductor 55, normally closed contacts 49 of a relay 48, pilot relay coil 8, conductor 56 and tripping relay contacts 17. There is also a circuit between the battery terminals through conductor 54, contacts of directional overload relay means 40, 41 and 42, conductor 53, contacts of the overload relays 43, 44 or 45, conductor 52, and control relay coil 19.

Connected to the conductors 54 and 53 are the coils 50 and 51 respectively of the relay 48 which conveniently is in the form of a beam relay and the other terminals of the coils are connected through a conductor 57 to the conductor 56. The contacts 49 revert to the closed position with a time lag.

If desired the "overload" elements 46 of the directional "overload" relay means may be arranged to open with some normal predetermined value of current. The same remark applies to the elements 29 of Figure 1. It is, however, preferred that they shall operate at some overload value of current and assuming this to be the case normally the contacts of the overload relays and overload elements of Figure 2 will be in the positions shown, whilst the contact 47 of each directional element will assume a position corresponding to the direction of power flow in the associated phase at its section end.

Similarly the "overload" relay contacts 43, 44 or 45, provided they close after the contacts 46 have opened, may be arranged to operate at some predetermined normal value of load current. It is preferred, however, that they shall have an overload setting as described. A similar remark applies to the contacts 30 of Figure 1. Moreover, although a time relay alone may be relied upon to ensure correct sequence of operation of the contacts of the overload relays and overload elements it is much preferred as described in connection with the drawings to employ different settings to which may be added a time delay since possibility of uncertainty of operation when the current is substantially equal to a single current setting is then avoided.

If, for example, an overload current flows through the section, say in the first phase, the power flowing from left to right, the overload element 46 of the directional overload relay means 40 at the right hand end of the section opens and the contact 47 of the directional element of that relay opens or remains open, whilst the overload relay 43 closes. At the left hand end of the section the contacts 46 of the overload element open but the contacts 47 of the directional element of the relay means 40 close. The overload relay 43 also closes its contacts. Consequently the control relay coil 19 is energized and this results in closure of the differential relay contacts 10 and the tripping relay contacts 17 at the right hand end of the section. Since, however, the contacts 46 and 47 of the right hand directional overload relay means 40 are open the tripping circuit is not completed, neither is the control relay coil 19 energized. The coil 50 of relay 48, however, is energized by reason of closure of the contacts 17 and the relay opens its contacts 49. At the left hand end since the tripping relay is not energized the tripping circuit is not completed. Also the coils 50 and 51 of the relay 48 are short-circuited by contacts of the relay means 40, 41 and 42.

When the fault is cleared any danger of opening of the circuit breaker 2 at the right hand end due to closure of contacts of the directional overload relay means 40 before the tripping relay has had time to open its contacts 17 is avoided since the contacts 49 reclose with a time lag.

If there is a fault in the section, say in the first phase, fed from both ends, the contacts 46 of the directional overload relay means 40 open, but the contacts 47 of the said relay means close or remain closed. The overload relays 43 also close. The coils 19 of the control relays are therefore energized with the result that the differential relays and tripping relays close their contacts 10 and 17 respectively. The coils 50 of the relays 48 are then energized, but the coils 51 are also energized through contacts of the relay means 40, 41 and 42 and hence the contacts 49 are maintained closed, the trip coils 5 are energized and the section is isolated.

If the fault is fed from only one end, say the left hand end, the overload relays and elements at the right hand end are unaffected and the relay means 40 and overload relay 43 at the left hand end operate in the manner just described, with the result that the coil 19 is energized and the control relay operates, thereby controlling closure at the right hand end of the section of the differential relay contacts 10 and the tripping relay contacts 17. Since the contacts 46 of the relay means 40, 41 and 42 at the right hand end are closed both coils 50 and 51 are energized and the contacts 49 are maintained closed. Hence the coils 8 and 5 are energized and the circuit breaker 2 and the pilot relay contacts 7 at the end in question open. Opening of the contacts 7 results in closure of the differential relay contacts 10 and tripping relay contacts 17 at the left hand end of the section. Prior to closure of the contacts 17 the coils 50 and 51 of relay 48 were short-circuited by contacts of the relay means 40, 41 and 42 and closure of the contacts effects energization of both coils. The contacts 49 remain closed, the tripping circuit is energized and the circuit breaker opens to clear the fault.

The operation for fault conditions on more than one phase will be clear without further description.

The relay 48 may take any suitable form. For example, the coils 50 and 51 may be arranged to operate differentially on a single plunger. Any suitable signalling arrangement other than the duplex system described may be used to exert controls between the ends of the section.

Figure 3:
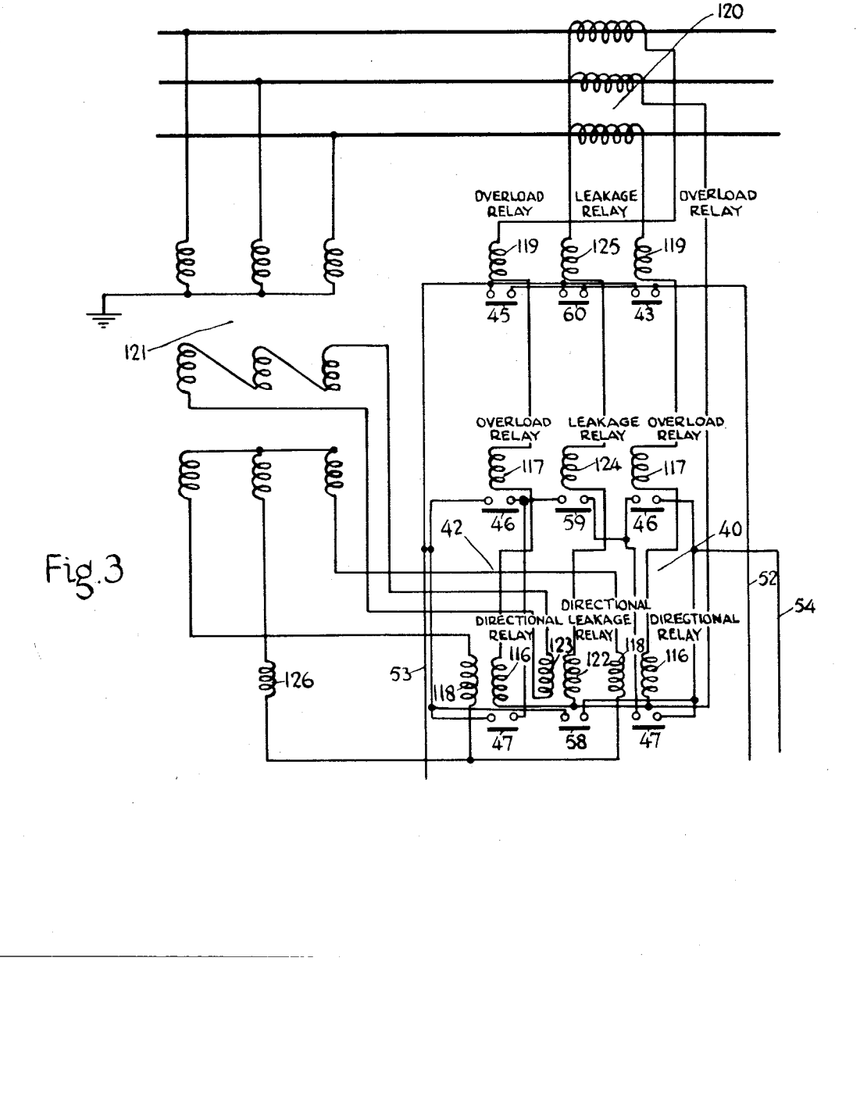

Figure 3 shows a modification applicable to the arrangement described in connection with Figure 2 of the drawings. It will be seen that the overload and directional overload relay means of one of the phases, as shown the second phase, have been omitted and instead have been substituted a sensitive directional earth leakage element having a current coil 122, a voltage coil 123 and contacts 58, a leakage element provided with an operating coil 124 and normally closed contacts 59 and a leakage relay having an operating coil 125 and normally open contacts 60. The contacts 60 are arranged to close when a predetermined value of earth leakage current flows. The value of earth leakage current at which the contacts 60 close may if desired be quite low, but through a lower setting or more rapid operation it is arranged that the leakage element shall open its contacts 59 before the contacts 60 close. When earth leakage power is flowing into the adjacent end of the section the contacts 58 close whilst when earth leakage power is flowing out of the end of the section the contacts 58 remain open. A balancing impedance 126 is connected in series with the second phase secondary winding of the transformer 121.

The contacts 60 are connected in parallel with the contacts of the overload relays at the end of the section. The contacts 59 of the earth leakage element are connected in series with the contacts of the directional overload relay means 40 and 42 and the contacts 58 of the directional element are adapted to bridge the contacts of the directional overload relay means and of the earth leakage element.

With faults between phases the directional overload relay means 40 and 42 and the overload relays 43 and 45 afford protection in the manner already described. In the case of an earth leakage fault, however, opening of the leakage element 59 renders the relays 40 and 42 ineffective and ensures that the discriminative control shall be exerted by contacts 58 and 60 of the directional earth leakage element and the leakage relay. The operation of the protective system with relays arranged as described with reference to Figure 3 will be clear without further description.

Figure 4:
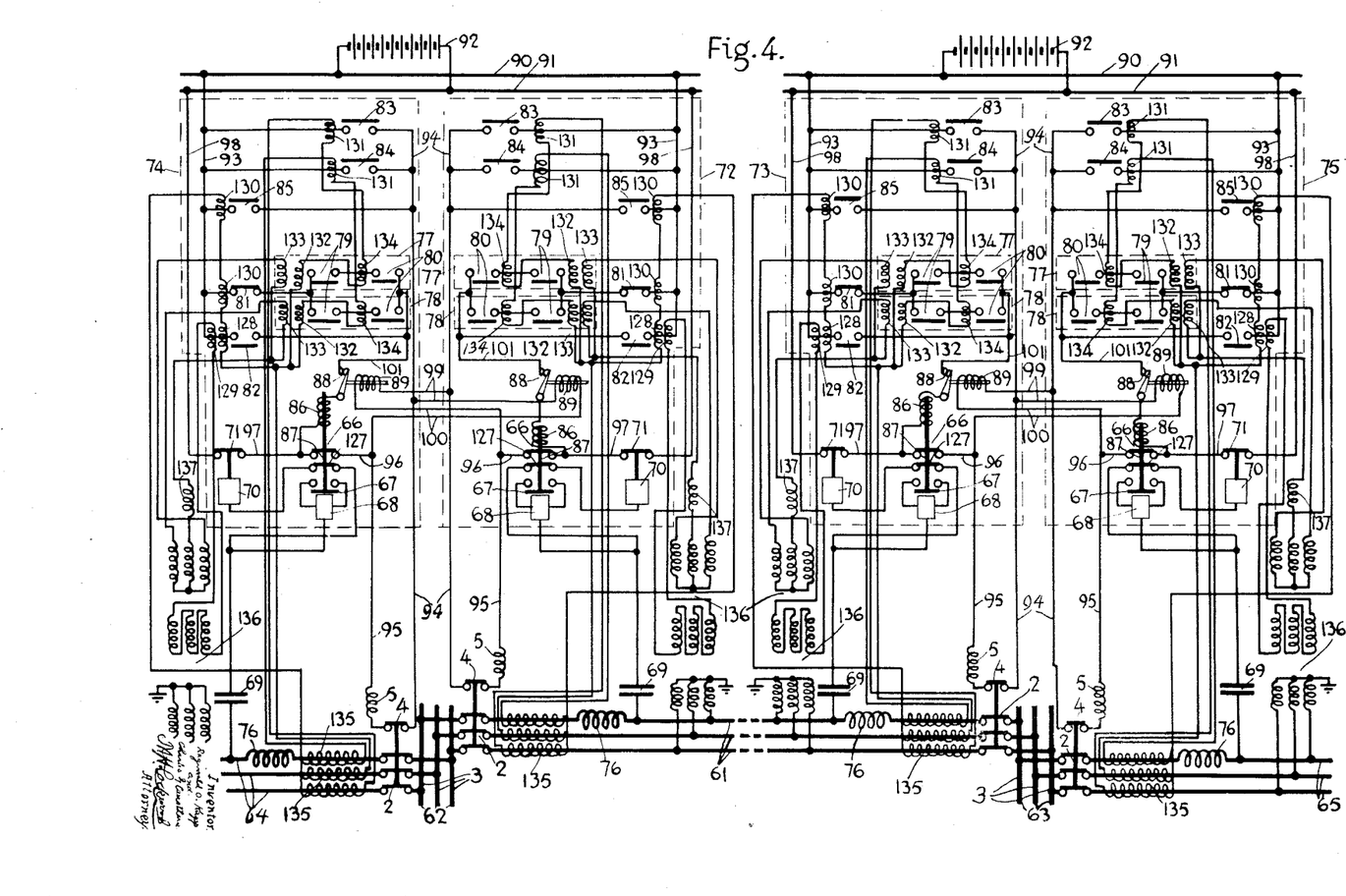
Figure 4 shows the relays and control apparatus at the ends of one section and at the adjacent ends of the two neighbouring sections, it being understood that generally protective arrangements in accordance with the invention will be applied to each section into which the system is divided. In the arrangement shown in Figure 4 control is exerted independently of pilot wires by means of carrier current superimposed on a line conductor.

In Figure 4 of the drawings a three phase section 61 of overhead line is shown extending between the busbars 3 of the stations 62 and 63, whilst to the left of the station 62 is shown part of a similar section 64 and to the right of the station 63 is shown part of a similar section 65. The sections are provided at their ends with circuit breakers 2 having auxiliary contacts 4 and trip coils 5.

Each section is provided with two equipments, one at either end. Thus the section 61 is provided with the equipments 72 and 73 and at the stations 62 and 63 are the equipments 74 and 75 belonging to the sections 64 and 65 respectively. Each equipment includes carrier-signalling means adapted to transmit and to receive impulses of carrier-current transmitted over a phase of the associated section, which so far as the carrier-current is concerned is sectionalized by means of the chokes 76 connected in one phase at the ends of the section. The equipment may take any suitable form, but suitable apparatus is, for example, described in the specification of British Patent application No. 33507/31.

In the arrangement shown each equipment comprises a transmitter 68 and a receiver 70 connected with an end of the phase provided with the chokes 76 of the associated section through a condenser coupler 69.

Each transmitter 68 is rendered instantly operative by closure of the contacts 67 of a control relay 66. The transmitters and receivers of the different equipments operate at the same frequency, but when the transmitter of one equipment becomes effective contacts 127 of relay 66 are at the same time actuated to render the receiver of the said equipment inactive.

When a receiver 70 receives a carrier-current impulse from the far end of the section it at once effects opening of the contacts 71 of a preventive relay. It will therefore be understood that if, say, the relay 66 at the left hand end of the section 61 closes its contacts 67 the transmitter 68 of equipment 72 transmits an impulse which causes the receiver 70 of the equipment 73 to open the contacts 71.

Each equipment also includes two directional overload relay means 77 and 78, a directional earth leakage relay with a current coil 128, a voltage coil 129 and contacts 82, earth leakage relays with contacts 81 and 85 and operating coils 130 and overload relays with contacts 83 and 84 and operating coils 131.

The directional overload relay means 77 and the overload relay with contacts 83 are associated with and are responsive to the conditions of one phase which may be called the first phase and the directional overload relay means 78 and the overload relay with contacts 84 are associated with and are responsive to the conditions of another phase which may be called the third phase.

Each directional overload relay means comprises a sensitive directional element having a current coil 132, a voltage coil 133 and contacts 79 and an overload element having an operating coil 134 and contacts 80. The contacts 79 and 80 are arranged in series and the contacts 79 close when power is flowing in the associated phase out of the adjacent section end and open when power is flowing in the associated phase into the adjacent section end. The contacts 80 are normally open but close instantaneously when there is an overload current of predetermined value, say 20% above full load, flowing in the associated phase.

The contacts 83 or 84 of an overload relay are normally open and close with a slight time lag, say one tenth of a second, when an overload current of predetermined value, greater than that at which the contacts 80 close, say 50% above full load, flows in the associated phase.

Each directional earth leakage relay is adapted instantaneously to close its normally open contacts 82 when an earth leakage current of predetermined value, say 20% of the full load current, flows out of the section at the adjacent end and each leakage relay with contacts 81, which are normally closed, also opens these contacts instantaneously at a predetermined value of earth leakage current conveniently the same as that at which the contacts 82 of the directional earth leakage relay close.

An earth leakage relay with contacts 85 is adapted to close the latter, which are normally open, with a time lag of say one tenth of a second at some value of earth leakage current greater than that at which a directional earth leakage relay operates, say 25% of full load current.

The overload relay contacts 83 and 84 and the earth leakage relay contacts 85 of the equipment are connected in parallel and the contacts of the directional overload relay means 77 and 78 are connected in parallel and in series with the earth leakage relay contacts 81, whilst the directional earth leakage relay contacts 82 are adapted to bridge the contacts 79 and 80 of the directional overload relay means and the earth leakage relay contacts 81.

The coils 128, 130, 131, 132 and 134 are coupled to the phase conductors through current transformers 135; the coils 129 and 133 are coupled to the phase conductors through a potential transformer 136, the secondary winding of which is provided with a balancing impedance 137.

The control relay 66, besides the normally open contacts 67, is provided with the normally closed contacts 87 and an operating coil 86. When the coil 86 is deenergized the relay restores with a small time delay. The equipment also comprises a back up relay including normally closed contacts 88 and an operating coil 89 energization of which causes the contacts 88 to open with a time delay of, say, a little over half a second.

The two equipments of each station, for example, the equipments 72 and 74 of station 62 are associated through common busbars 90, 91 with a source of control current such as a battery 92.

It will be seen that the tripping circuit of a particular circuit breaker and equipment extends between the busbars 90, 91 through conductor 93 the contacts 83, 84 or 85, conductor 94, auxiliary contacts 4, trip coil 5, conductors 95 and 96, contacts 87 of control relay 66, conductor 97, preventive contacts 71 and conductor 98. In parallel with the trip coil of one particular circuit breaker and equipment is the coil 89 of the back up relay of the other equipment of the same station. Thus at station 62 in parallel with the trip coil 5 of the circuit breaker of section 61 is a circuit including conductor 99, back up relay coil 89 of equipment 74 and conductor 100. Hence energization of the coil 5 of one section is accompanied by energization of the coil 89 of the adjacent section at the same station.

It will also be seen that a circuit for the coil 86 of the control relay extends between the busbars 90, 91 through conductor 93 and through contacts 81 and the contacts of a directional overload relay means 77 or 78 or through directional earth leakage contacts 82 and through conductor 101, back up relay contacts 88, the coil 86, conductor 97, preventive contacts 71 and conductor 98.

Under normal circumstances the overload relay contacts 83 and 84 the earth leakage relay contacts 85 and 81, the directional earth leakage relay contacts 82 and the contacts 80 of the overload elements are in the positions shown, whilst the contacts 79 of the directional elements assume positions in dependence on the direction of power flow in the associated phases at the adjacent section ends. The transmitters 68 although in condition to transmit effect no signal since the control relay contacts 67 are open.

If an overload current flows say in the first and third phases through the sections 61, 64 and 65, the power passing, for example, from left to right, then so far as the section 61 is concerned at the right hand end of the section the contacts 79 and 80 of the directional overload relays means 77 and 78 close and the control relay 66 operates, whereby its contacts 87 interrupt the tripping circuit at that end of the section and the transmitter 68 sends a carrier-current impulse which affects the receiver 70 at the left hand end of the section so that the latter opens the preventive contacts 71 and maintains them open so long as the impulse is received. The contacts 71 interrupt the tripping circuit at the left hand end of the section. At both ends of the section the overload relays close their contacts 83, 84, but to no effect since the tripping circuits have been interrupted.

Similarly the transmitter 68 shown at the right hand end of section 64 sends out an impulse and the receiver 70 shown at the left hand end of section 65 receives an impulse and both those sections are maintained in circuit notwithstanding operation of their overload relays.

When the fault is cleared any danger which there might be of opening the circuit breaker at the end of a sound section owing to closure of control relay contacts 87 or preventive contacts 71 before opening of the overload relay contacts 83 or 84 is obviated since the relays 66 restore with a time lag.

If there is a fault in a section, let it be supposed the section 61 in the first and third phases and fed from both ends the contacts 80 of the overload elements of the directional overload relay means 77 and 78 at both ends of the section close, but since the contacts 79 of the directional elements open or remain open the coils 86 of the control relays are not energized. Closure of the overload relay contacts 83 and 84 therefore effects opening of the circuit breakers 2 at the ends of the section. Cutting out of the sound sections such as 64 and 65 is prevented in the manner already described.

If the fault is fed from one end only, for instance, the right hand end the equipment 72 remains inactive, since the overload relays and overload elements remain open, and no impulse is sent by the transmitter 68 at the left hand end. At the right hand end, although the contacts 80 of the overload elements close, the relay means 77 and 78 are ineffective since the contacts 79 of the directional elements are open. Hence the control relay contacts 87 and the preventive contacts 71 remain closed and closure of the overload relay contacts 83 and 84 effects opening of the circuit breaker at the right hand end of the section.

If the fault is between the first and second phases or between the second and third phases only the overload relay and overload element associated with the first phase or the third phase respectively at an end of the section will be affected, but it will be clear without further description that otherwise the operation of the protective apparatus is similar to that described above.

If there is an earth fault in the system giving sufficient residual current and the earth leakage current flows through a sound section say the section 61, the power flowing, for example, from left to right the earth leakage relay contacts 81 at both ends of the section open and render the directional overload relay means 77 and 78 ineffective. Also the directional earth leakage relay contacts 82 at the right hand end of the section close with the result that the relay 66 at that end operates and the preventive contacts 71 at the left hand end open. Therefore opening of the circuit breakers 2 on account of closure of the earth leakage relay contacts 85 at the ends of the section is prevented.

If, however, there is an earth fault in the section fed from both ends, at either end the earth leakage relay contacts 81 open and the directional earth leakage relay contacts 82 remain open and closure of the earth leakage relay contacts 85 effects opening of the circuit breaker 2 so that the section is completely isolated.

If the earth fault is fed from only one end it will be clear that the circuit breaker 2 at the said end will open since the equipment at the other end of the section is unaffected by the fault current.

If a circuit breaker fails to open when its tripping circuit is energized the fault is cleared by cutting out of the next section adjacent the circuit breaker. Thus, for example, if the section 65 is faulty and the trip coil 5 at the left hand end of the section is energized but the circuit breaker fails to open, the coil 89 of equipment 73, which is energized together with the said trip coil 5, after the agreed time delay opens the contacts 88 of the back up relay with the result that the coil 86 of relay 66 at the right hand end of section 61 is deenergized so that the said relay restores and by so doing completes the tripping circuit through its contacts 87 at its end of the section and by opening its contacts 67 effects closure of the preventive contacts 71 and completion of the tripping circuit at the left hand end of the section 61 which is therefore cut out.

It is noteworthy that the protective arrangement definitely affords protection at agreed values of overload on phases or of residual current independently of the direction of main power flow in the system. Moreover breakdown of the phase constituting the channel of communication does not prevent cutting out of a faulty section.

It will be clear to those skilled in the art that the arrangement may be modified in many ways. For example, instead of using separate overload elements and relays the contacts of the overload element and relay of a phase may be combined in a single relay, the contacts corresponding to the contacts 83 or 84 of an overload relay, however, closing with a time lag. It is much preferred, however, that the contacts shall operate at different settings since there is then no danger of uncertainty of operation when an overload has a value nearly equal to the setting of the single relay combining the two contacts.

The directional and overload elements might be differently arranged, For example, it could be arranged to control the overload elements by the directional elements in such a way that an overload on a phase is ineffective to operate an overload element unless the power flow in the phase is in one direction, namely out of the adjacent end of the section.

The directional earth leakage and earth leakage relays might be omitted, each phase being provided at either end with directional and overload elements and an overload relay.

For the carrier-signalling system utilizing a phase of the section may be substituted any suitable signalling means for exerting control between the ends of the section.

With regard to the question of combining the contacts of the overload element and relay of a phase in a single relay it will be appreciated that apart from the question of economy there is the further advantage that one set of contacts is now bound to operate before the other set of contacts and if the relay is adapted to operate the contacts at different current settings correct sequence of operation of the various contacts is ensured. In Figure 2, for example, the contacts of the overload relay 43, 44 or 45 may be combined in one relay with the contacts 46 of the directional overload relay means 40, 41 or 42. Preferably the time lag between the opening of contacts 46 and closure of the contacts of overload relay 43, 44 or 45, assuming a sufficiently high current to operate both sets of contacts, is adjustable. Similarly the contacts such as 59 and 60 of Figure 3 may be combined in a single relay and as has already been mentioned contacts such as 80 of a directional overload relay 77 and overload relay contacts 83 may be combined in a single current relay, the contacts being arranged to operate in succession and preferably at different current settings. The contacts 81 and 85 at a section end may also be combined in one relay.

We claim:—

1. A discriminative protective arrangement for a sectionalized polyphase electric power transmission system comprising protective switching means associated with a section and means for governing the operation of the protective switching means including means for exerting control at one end of the section from the other end thereof, single phase power directional elements respectively operatively associated with different phases at the said section end, single phase current elements respectively operatively associated with the said phases at the said section end, the directional and current elements of the same phase being adapted to act in conjunction to effect control and current elements at the section ends required to be operated to cut out the ends of the section.

2. A discriminative protective arrangement for a sectionalized polyphase electric power transmission system comprising protective switching means associated with a section and means for governing the operation of the protective switching means including means for exerting control at one end of the section from the other end thereof, sensitive single phase power directional elements respectively operatively associated with different phases at an end of the section and single phase current elements having predetermined current settings respectively operatively associated with the said phases at the said section end, the directional, current elements of a phase being arranged to act in conjunction in order to effect control upon operation thereof responsively to power flow in the said phase in a given direction and to phase current above the predetermined value and current elements at the section ends required to be operated to cut out the ends of the section.

3. A discriminative protective arrangement for a sectionalized polyphase electric power transmission system comprising protective switching means associated with a section and means for governing the operation of the protective switching means including means for exerting control at one end of the section from the other end thereof, single phase power directional elements respectively operatively associated with different phases at an end of the section, single phase current elements respectively operatively associated with the said phases at the said end of the section and current relay means adapted to be responsive to circuit conditions at an end of the section required to be operated to cut out the section end, the directional and current elements of the same phase being arranged to act in conjunction to exert control and the current element of a phase and the current relay means being adapted to operate in sequence.

4. A discriminative protective arrangement for a sectionalized polyphase electric power transmission system comprising protective switching means associated with the section and means for governing the operation of the protective switching means including means for exerting control at an end of the section from the other end thereof, single phase current relay means respectively operatively associated with different phases at one end of the section, at the other end of the section single phase power directional elements and single phase current relay means respectively operatively associated with the said phases, the directional element and the current relay means of a phase being provided with contacts of which the contacts of the current relay means at opposite ends of the section are arranged to operate in sequence, whilst the contacts of the current relay means at the first section end are adapted to control operation of protective switching means at the said section end and the directional element and current relay means at the said other end of the section are adapted to act in conjunction and also to control operation of the protective switching means at the first section end.

5. A discriminative protective arrangement for a sectionalized polyphase electric power transmission system comprising means for exerting control at either end of a section from the other end thereof and at each end of the section protective switching means associated with the section, tripping means for effecting operation of the switching means, a remote controlled device for controlling the tripping means, single phase power directional elements operatively associated with different phases and provided with contacts and single phase current relay means respectively operatively associated with the said phases and provided with contacts, one contact of the current relay means of a phase at a section end being adapted to control the adjacent tripping means and another contact of the said current relay means together with a contact of the adjacent directional element of the phase being adapted to control the remote controlled device at the far end of the section, whilst the one contact and the other contact of the current relay means of a phase at opposite ends of the section are adapted to operate in sequence.

6. A discriminative protective arrangement for a sectionalized polyphase electric power transmission system comprising means for exerting control at either end of the section from the other end thereof and at each end of the section protective switching means associated with the section, tripping means for effecting operation of the switching means, a remote controlled device for controlling the tripping means, single phase power directional elements operatively associated with different phases and provided with contacts and single phase current relay means respectively operatively associated with the said phases and provided with contacts, one contact of the current relay means of a phase at a section end being adapted to control the adjacent tripping means and another contact of the said current relay means together with a contact of the adjacent directional element of the phase being adapted to control the remote controlled device at the far end of the section, whilst the one contact and the other contact of the current relay means of a phase at an end of the section are adapted to operate in sequence.

7. A discriminative protective arrangement for a sectionalized polyphase electric power transmission system comprising means for exerting control at either end of the section from the other end thereof and at each end of the section protective switching means associated with the section, tripping means for effecting operation of the switching means, a remote controlled device for controlling the tripping means, single phase power directional elements operatively associated with different phases and provided with contacts and single phase current relay means respectively operatively associated with the said phases and provided with contacts, one contact of the current relay means of a phase at a section end together with a contact of the adjacent directional element of the phase being adapted to control the adjacent tripping means and another contact of the said current relay means together with a contact of the adjacent directional element of the phase being adapted to control the remote controlled device at the far end of the section, whilst the one contact and the other contact of the current relay means of a phase at opposite ends of the section are adapted to operate in sequence.

8. A discriminative protective arrangement in accordance with claim 7, and comprising at each end of the section single phase current relay means provided with series connected contacts for controlling the adjacent tripping means, single phase current relay means provided with parallel connected contacts for effecting control of the remote controlled device at the far end of the section and single phase directional elements provided with contacts, the contacts of the directional element of a phase being arranged to impart directional characteristics to the current relay means of that phase.

9. A discriminative protective arrangement in accordance with claim 7 and comprising at each end of the section single phase current relay means, the different current relay means being provided with contacts that are parallel connected and contacts that are series connected, and single phase directional elements provided with contacts, the said series connected contacts of the current relay means of different phases respectively being arranged in parallel with the contacts of the directional elements of the said phases and the said series connected contacts in association with the said contacts of the directional elements being adapted to control the adjacent tripping means and being connected in series with the said parallel connected contacts and being adapted together with the latter contacts to control the remote controlled device at the far end of the section.

10. A discriminative protective arrangement in accordance with claim 7, and comprising at each end of the section single phase directional elements provided with contacts and single phase current relay means, the several current relay means of different phases being provided with contacts which are parallel connected and are adapted to control the adjacent tripping means and with contacts which are respectively in series with the contacts of the directional elements of similar phase, the contacts of the current relay means and the directional elements thus connected in series being arranged in parallel and adapted to control the remote controlled device at the far end of the section.

11. A discriminative protective arrangement for a sectionalized polyphase electric power transmission system comprising means for exerting control at either end of a section from the other end thereof and at each end of the section protective switching means associated with the section, tripping means for effecting operation of the switching means, a remote controlled device for controlling the tripping means, means including a power directional relay operatively associated with the section and responsive to circuit conditions at the section end and adapted to control the adjacent tripping means and the remote controlled device at the far end of the section, together with time delay means controlled by the said means including a power directional relay at an end of the section and arranged upon interruption of power flowing out of the section to a fault to inhibit operation of switching means at an end of the section before expiration of a time delay.

12. A discriminative protective arrangement for a sectionalized polyphase electric power transmission system comprising means for exerting control at either end of the section from the other end thereof and at each end of the section protective switching means associated with the section, tripping means for effecting operation of the switching means, a remote controlled device arranged to control the tripping means, time delay means associated with a contact for controlling the tripping means, single phase power directional elements operatively associated with different phases and provided with contacts and single phase current relay means respectively operatively associated with the said phases and provided with contacts, one contact of the current relay means of a phase at a section end being adapted to control the adjacent tripping means and another contact of the said current relay means together with a contact of the adjacent power directional element of the phase being adapted to control the remote controlled device at the far end of the section and the time delay means at an end of the section, whilst the one contact and the other contact of the current relay means of a phase at an end of the section are adapted to operate in sequence and the time delay means operating through the associated contact is arranged upon interruption of power flowing out of the section to a fault to prevent the tripping means at an end of the section from becoming effective before expiration of a time delay.

13. A discriminative protective arrangement for a sectionalized polyphase electric power transmission system comprising means for exerting control at either end of the section from the other end thereof and at each end of the section protective switching means associated with the section, tripping means for effecting operation of the switching means, a remote controlled device arranged to control the tripping means, single phase power directional elements operatively associated with different phases and provided with contacts and single phase current relay means respectively operatively associated with the said phases and provided with contacts, one contact of the current relay means of a phase at a section end being adapted to close with a time delay and being arranged together with a contact of the adjacent power directional element of the phase to control the adjacent tripping means and another contact of the said current relay means together with a contact of the adjacent power directional element of the phase being adapted to control the remote controlled device at the far end of the section, whilst the one contact and the other contact of the current relay means of a phase at opposite ends of the section are adapted to operate in sequence.

14. A discriminative protective arrangement for a sectionalized polyphase electric power transmission system comprising protective switching means associated with the section and means for governing the operation of the protective switching means including means for exerting control at an end of the section from the other end thereof, single phase current relay means respectively operatively associated with different phases at one end of the section, earth leakage relay means operatively associated with the section at the said end and provided with contacts adapted to control operation of protective switching means at that end of the section and at the other end of the section directional earth leakage relay means and single phase power directional elements and single phase current relay means respectively operatively associated with the said phases, the directional earth leakage relay means also being provided with contacts adapted to control operation of the protective switching means at the first end of the section, and the contacts of the directional earth leakage relay means and the earth leakage relay means being adapted to operate in sequence, whilst the directional element and the current relay means of a phase comprise contacts of which the contacts of the current relay means at opposite ends of the section are arranged to operate in sequence and the contacts of the current relay means at the first section end are adapted to control operation of the said protective switching means at that end of the section and the directional element and current relay means at the said other end of the section are adapted to act in conjunction and also to control operation of the said protective switching means.

15. A discriminative protective arrangement for a sectionalized polyphase electric power transmission system comprising means for exerting control at either end of a section from the other end thereof and at each end of the section protective switching means associated with the section, tripping means for effecting operation of the switching means, a remote controlled device for controlling the tripping means, earth leakage relay means and directional earth leakage relay means provided with contacts and operatively associated with the section, single phase power directional elements operatively associated with different phases and provided with contacts and single phase current relay means respectively operatively associated with the said phases and provided with contacts, one contact of the current relay means of a phase at a section end being adapted to control the adjacent tripping means, a contact of the earth leakage relay means also being adapted to control the adjacent tripping means, another contact of the said current relay means together with a contact of the adjacent directional element of the phase being adapted to control the remote controlled device at the far end of the section, a contact of the directional earth leakage relay means also being adapted to control the said remote controlled device, whilst the one contact and the other contact of the current relay means of a phase as also the contacts of the earth leakage and directional earth leakage relay means at opposite ends of the section are adapted to operate in sequence and contacts of the earth leakage relay means are adapted upon operation thereof to render the adjacent directional elements ineffective.

16. A discriminative protective arrangement in accordance with claim 15, and in which at each end of the section current relay and earth leakage relay contacts that control the adjacent tripping means are connected in parallel with one another, normally closed earth leakage relay contacts that on operation render the adjacent directional elements ineffective are connected in series with the contacts of the said elements and of the current relay means that together control the remote controlled device at the far end of the section, and contacts of the directional earth leakage relay are arranged to bridge the latter contacts together with the said earth leakage relay contacts that on operation render the adjacent directional elements ineffective.

17. A discriminative protective arrangement for a sectionalized polyphase electric power transmission system comprising a carrier signalling system for exerting control at either end of a section from the other end thereof and at each end of the section protective switching means associated with the section, tripping means for effecting operation of the switching means, a remote controlled device for controlling the tripping means, a control relay provided with contacts for controlling the adjacent tripping means and through the signalling system the remote controlled device at the far end of the section, single phase power directional elements operatively associated with different phases and provided with contacts and single phase current relay means respectively operatively associated with the said phases and provided with contacts, one contact of the current relay means of a phase at a section end being adapted to control the adjacent tripping means and another contact of the said current relay means together with a contact of the adjacent directional element of the phase being adapted to control the adjacent control relay, whilst the one contact and the other contact of the current relay means of a phase at opposite ends of the section are adapted to operate in sequence.

18. A discriminative protective arrangement in accordance with claim 17, and comprising at an end of the section a time delay relay having a control coil and contacts adapted to operate with a time lag to render a control exerted by a contact of a current relay means together with a contact of a directional element ineffective and protective means associated with the next adjacent section and including protective switching means associated with the section at the end thereof near the said time delay relay, tripping means for effecting operation of the switching means, means arranged to operate responsively to a fault in the section and thereby to initiate operation of the said tripping means and the said time delay relay and auxiliary contacts associated with the said protective switching means and arranged upon operation of the protective switching means to arrest operation of the time delay relay.

19. A discriminative protective arrangement for a sectionalized polyphase electric power transmission system comprising protective switching means associated with the section and means for governing the operation of the protective switching means including means for exerting control at an end of the section from the other end thereof, tripping means for effecting operation of protective switching means at the first end of the section, a remote controlled device for controlling the tripping means, relay means responsive to circuit conditions at the first end of the section and adapted to control the tripping means and to operate when fault current flows into the section at the said end, further relay means responsive to circuit conditions at the second end of the section, the further relay means being more sensitive than the said relay means at the first end of the section and being adapted when current flows out of the second end of the section to a fault to effect operation of the remote controlled device which when operated prevents the said tripping means from becoming effective.

20. A discriminative protective arrangement in accordance with claim 19 and in which the further relay means are adapted to operate more quickly than the relay means at the first end of the section.

REGINALD OTTO KAPP.
CHARLES GEORGE CARROTHERS.